(12) United States Patent
Blume et al.

(10) Patent No.: US 11,734,243 B2
(45) Date of Patent: Aug. 22, 2023

(54) SPARSE MAPPING OF HIERARCHICAL SUBSET

(71) Applicant: Google LLC, Mountain View, CA (US)

(72) Inventors: Arthur E. Blume, Melrose, MA (US); Ye-Jeong Kim, Menlo Park, CA (US)

(73) Assignee: Google LLC, Mountain View, CA (US)

( * ) Notice: Subject to any disclaimer, the term of this patent is extended or adjusted under 35 U.S.C. 154(b) by 91 days.

(21) Appl. No.: 17/518,968

(22) Filed: Nov. 4, 2021

(65) Prior Publication Data
US 2023/0132648 A1  May 4, 2023

(51) Int. Cl.
*G06F 16/22* (2019.01)
*G06F 16/23* (2019.01)
*G06F 16/28* (2019.01)

(52) U.S. Cl.
CPC ...... *G06F 16/2246* (2019.01); *G06F 16/2365* (2019.01); *G06F 16/282* (2019.01)

(58) Field of Classification Search
CPC ............. G06F 16/2246; G06F 16/2365; G06F 16/282; G06F 16/23; G06F 16/25
See application file for complete search history.

(56) References Cited

U.S. PATENT DOCUMENTS

| | | | | |
|---|---|---|---|---|
| 7,937,399 | B2 * | 5/2011 | Furusho | G06F 16/9027 707/758 |
| 8,161,396 | B2 | 4/2012 | Barber et al. | |
| 9,804,747 | B2 | 10/2017 | Schmitlin et al. | |
| 9,886,465 | B2 | 2/2018 | Lucca et al. | |
| 10,204,174 | B2 * | 2/2019 | Kim | G06F 16/2237 |
| 10,229,223 | B2 * | 3/2019 | Anchuri | G06F 16/2465 |
| 2005/0138072 | A1 | 6/2005 | Russo et al. | |
| 2013/0218899 | A1 * | 8/2013 | Raghavan | G06F 16/9024 707/E17.083 |
| 2018/0004751 | A1 * | 1/2018 | Vikhe | G06F 16/248 |

* cited by examiner

*Primary Examiner* — Alford W Kindred
*Assistant Examiner* — Cecile H Vo
(74) *Attorney, Agent, or Firm* — Fish & Richardson P.C.

(57) ABSTRACT

Methods, systems, and apparatus, including computer programs encoded on a computer storage medium, for generating a sparse mapping of a data hierarchy. In one aspect, a method includes accessing a data hierarchy of elements, receiving a list of identifiers that each identify an element in the data hierarchy; determining, from the data hierarchy and the list of identifiers, a minimum tree that includes each of the identified elements identified by the list of identifiers additional elements that are not identified by the list of identifiers, where the identified elements and the additional elements define a set of a minimum number of elements necessary to form a path in the data hierarchy that connects all of the identified elements identified by the list of identifiers, and where the elements that belong to the minimum tree are a proper subset of elements of the data hierarchy.

17 Claims, 7 Drawing Sheets

SPARSE MAPPING OF HIERARCHICAL SUBSET

BACKGROUND

Data hierarchies are commonly used to represent complex hierarchal relationships between entities. Such hierarchal relationships may include employee organizational charts, products in inventory, projects, biological or familial relationships, and the like.

Often a user may be interested in only a small number of elements that are represented within the data hierarchy. However, if the data hierarchy is large, the user may have difficulty in identifying the subset of data that is of interest to the user. Various data analysis processes can be used to assist the user in identifying the subset of data, but often these processes include data that may not be of particular interest to the user and do not delineate to the user which data are relevant to the user and which data are not relevant. Moreover, processing large data hierarchies to identify a subset of data can be time intensive, and thus each time a system processes a list elements, the display of the data may lag for the user while the underlying data hierarchy is processed.

SUMMARY

This specification describes technologies relating sparse mapping of a hierarchical subset of data in a data hierarchy. The sparse mapping is displayed to indicate to the user data elements that are required for the mapping and distinguish between elements that may be of interest to the user and elements that may not be of interest to the user.

In general, one innovative aspect of the subject matter described in this specification can be embodied in methods that include the actions of accessing a data hierarchy of elements, the elements including: a root element that does not descend from another element, a plurality of intermediate elements, wherein each intermediate element descends directly from the root element or descends from another intermediate element, and a plurality of leaf elements, wherein each leaf element descends directly from an intermediate element or descends directly from the root element, and from which no other elements descend; receiving a list of identifiers, each identifier identifying an element in the data hierarchy as an identified element; determining, from the data hierarchy and the list of identifiers, a minimum tree that includes: each of the identified elements identified by the list of identifiers, and additional elements that are not identified by the list of identifiers; wherein the identified elements and the additional elements define a set of a minimum number of elements necessary to form a path in the data hierarchy that connects all of the identified elements identified by the list of identifiers, and wherein the elements that belong to the minimum tree are a proper subset of elements of the data hierarchy; generating, from the minimum tree, display data that causes a display device to: display the minimum tree as a set of edges and nodes, where each node represents an element in the data hierarchy and each edge connects at least two nodes according to the data hierarchy, display each node that represents an identified element identified by an identifier in the list of identifiers with a first visual characteristic and display each node that represents an additional element not identified by an identifier in the list of identifiers without the first visual characteristic. Other embodiments of this aspect include corresponding systems, apparatus, and computer programs, configured to perform the actions of the methods, encoded on computer storage devices.

Particular embodiments of the subject matter described in this specification can be implemented to realize one or more of the following advantages. By scaling the minimum tree so that the entire minimum tree is displayed within a visible portion of a viewport, the systems and methods facilitate an efficient use of limited display space.

Additionally, representing the list of identifiers as a list of tokens in a uniform resource identifier enables the use of a simple browser to display the minimum tree. Associating the display data, once generated, with the uniform resource identifier also eliminates the need to reprocess the list to generate the display data each time the uniform resource identifier is accessed or input, which, in turn, conserves computing resources.

An error checking process can also be implemented to ensure that the list of identifiers identifies elements currently in the data hierarchy so that stored lists do not display inaccurate minimum trees.

Elements that are not identified in the list of identifiers but that are required to establish the minimum tree are visually distinguished from the elements that are identified in the list of identifiers. This allows a user to visually distinguish elements identified in the list of identifiers from other elements. These other elements may be less interest to the user, but still may require user consideration. For example, if the data hierarchy is an enterprise organizational chart, the other elements may be supervisors of workers identified in the list of identifiers. Accordingly, a user then has the contact information of the workers' supervisors should the user need to contact the supervisors, e.g., to determine whether the identified workers are available for project for which the workers have been selected to staff The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
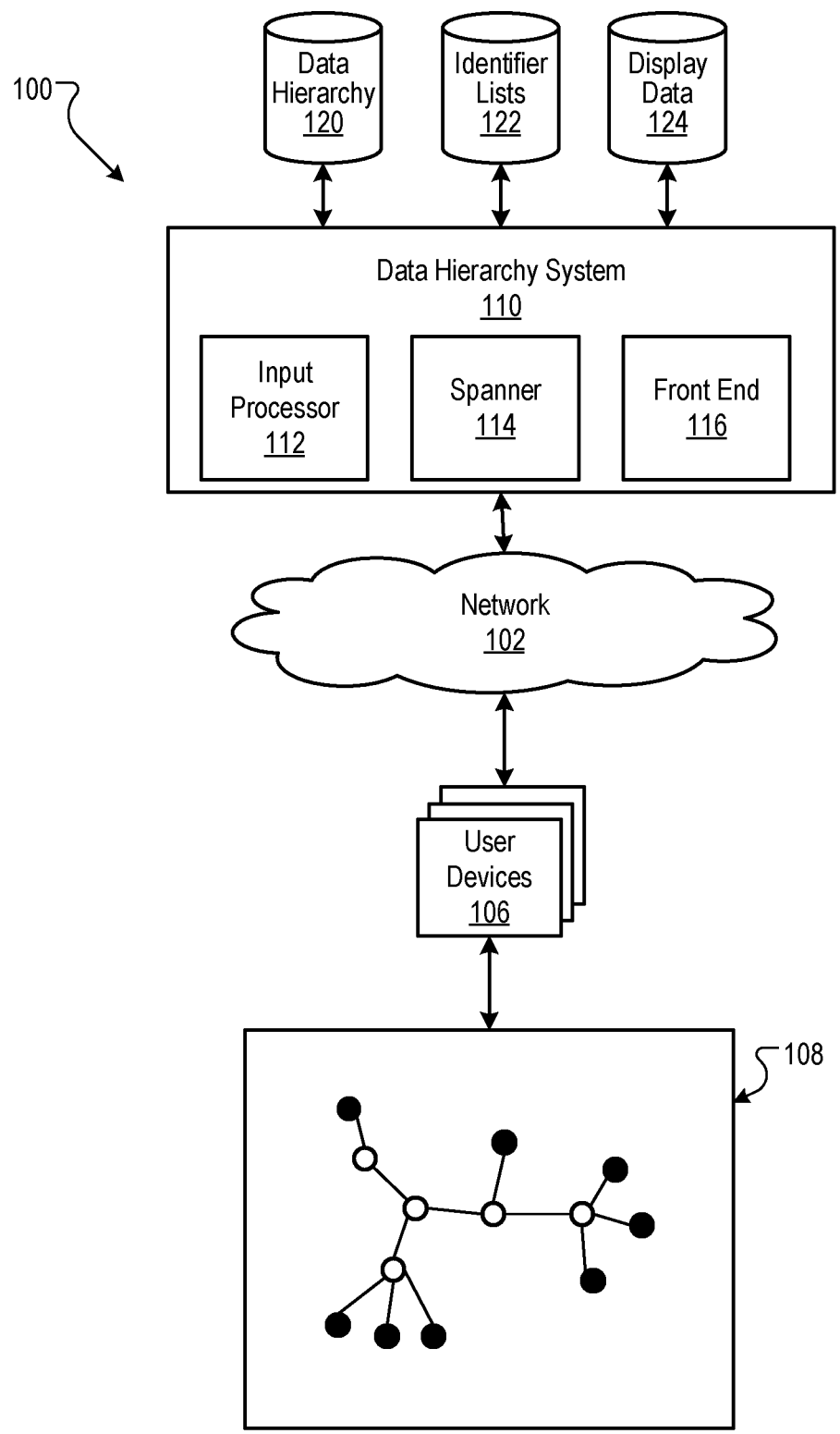
FIG. 1 is a block diagram of an example environment in which a data hierarchy system can be implemented.

FIG. 1 is a block diagram of an example environment 100 in which a data hierarchy system 110 can be implemented. A computer network 102, such as a local area network (LAN), wide area network (WAN), the Internet, or a combination thereof, connects user devices 106 to the data hierarchy system 110. The devices 106 may belong to members of an enterprise, e.g., employees of a company, or may belong to public users.

Each user device 106 is an electronic device capable of requesting and receiving resources over the network 102. Example user devices 106 include personal computers, mobile communication devices, and other devices that can send and receive data over the network 102. A user device 106 typically includes a user application, such as a web browser, to facilitate the sending and receiving of data over the network 102.

In the example shown, the data hierarchy system 110 includes an input processor 112, a spanner 114, and a front end 116. The system 110 has access to a data hierarchy 120, identifier lists 122, and display data 124. As will be described in more detail below, the input processor 112 receives or accesses a list of identifiers, and determines whether the identifiers are to be provided to the spanner 114. For example, if the list of identifiers is already present in the identifier lists 122 and associated with display data in the display data 124, then the display data 124 may be quickly accessed and provided to the user device. Conversely, if the list of identifiers has not been processed before, then the input processor 112 provides the list to the spanner 114. The spanner 114, upon receiving the list of identifiers, determines a minimum tree 108 from the identifiers and the data hierarchy 120. The front end 116, in turn, generates display data that causes a user device 106 to display the minimum tree as nodes and edges, and provides the display data to one or more user devices 106.

The input process 112 is a module that processes the identifier list and, optionally, can check the identifier lists 122 to determine if the identifier list has been previously processed. It may also be able to write the list to the identifier lists 122 for future retrieval and processing.

The spanner 114 is a module that determines a minimum span of elements in the data hierarchy 120 that is required to include all the elements identified by the identifiers in the identifier list. Any appropriate spanning process can be used.

The front end 116 is a module that generates display data for display on a user device. For example, the front end 116 may be a web server in the context of a browser-based implementation.

The data hierarchy 120 defines a hierarchy of elements. The elements include a root element that is at the "top" of the hierarchy, i.e., the root element does not descend in the hierarchy from another element. The data hierarchy 120 also includes intermediate elements, where each intermediate element descends directly from the root element or descends from another intermediate element, and from which at least one other element descends. Finally, the data hierarchy 120 also includes leaf elements, where each leaf element descends directly from an intermediate element or descends directly from the root element. No other elements descend from a leaf element.

The elements may represent products, employees, projects, geographic areas, or any other elements that may be represented according to a hierarchy. In this written description, the system will be described in the context of processing an enterprise organizational chart that is modeled by the data hierarchy 120; however, the methods and processes described in this specification are also applicable to data hierarchies that represent other concepts. Note that while a unidirectional graph is described, other graphs may also be processed by the system 110. These other graphs include bidirectional graphs, cyclic graphs, etc.

Because determining a minimum span in the data hierarchy 120 can be processor intensive, in some implementations, after the spanner 114 determines a minimum tree and the front end 116 generates the display data for a list of identifiers, the display data and identifier list are associated with each other. Should the identifier list be input again or selected, the associated display data stored in the display data 124 can thus be quickly retrieved and displayed. In particular, the identifier lists 122 store lists of identifiers that have been input by users, and the display data 124 stores display data for each list of identifiers that has been previously processed. Together the identifier lists 122 and display data 124 are respectively associated with each other, e.g., [{L1}, {D1}], [{L2, D2}] . . . [{Ln, Dn}], where {Lx} is an xth list of identifiers, and {Dx} is an xth set of display data for an xth minimum tree determined from the xth list of identifiers {Lx}. Accordingly, at a later time, should a list of identifiers be input that matches an identifier list stored in the identifier lists 122, the corresponding display data 124 can be retrieved without the spanner 114 determining the minimum tree and without the front end 116 generating the display data from the minimum tree.

Figure 2:
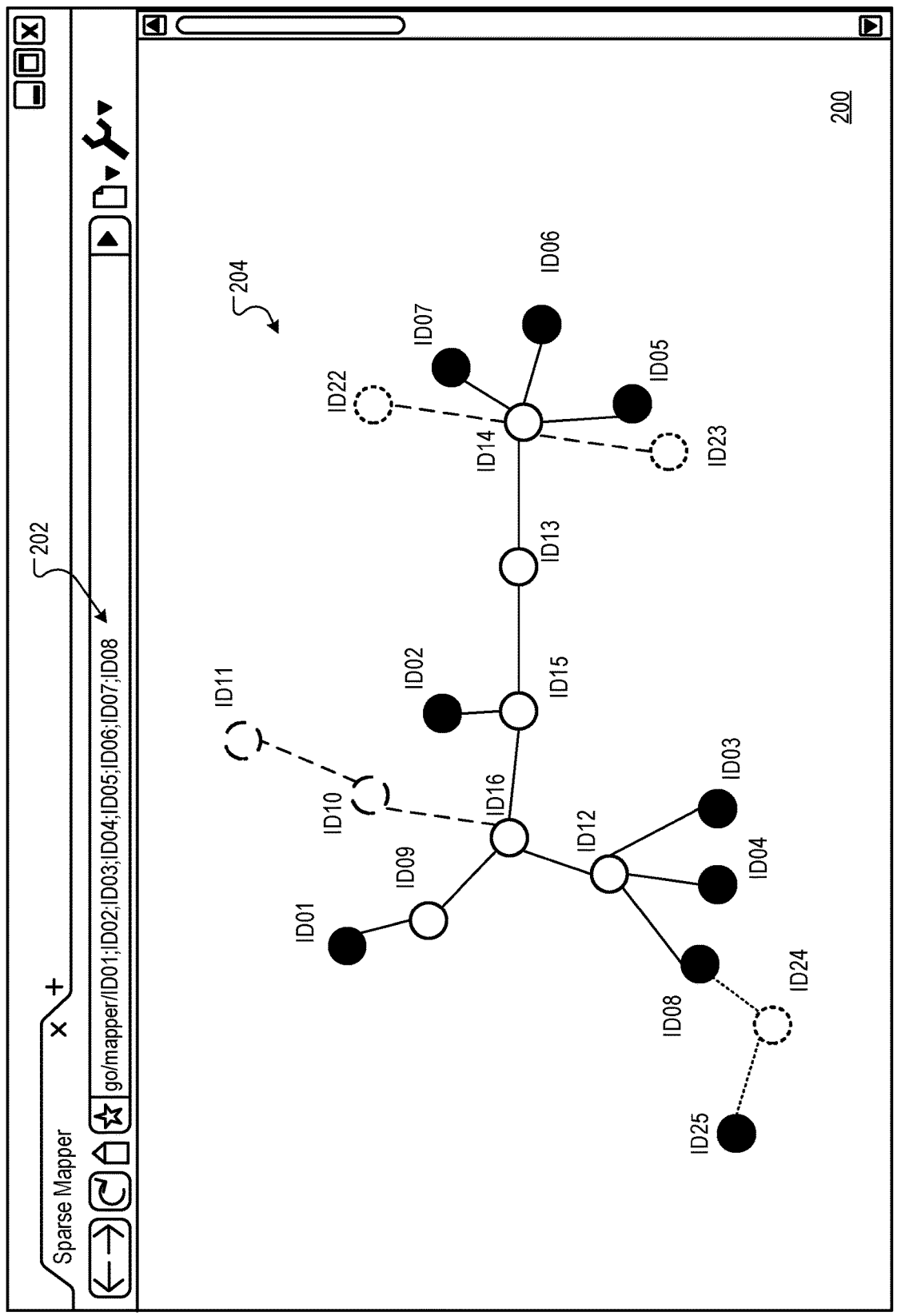
FIG. 2 is an illustration of a display of a minimum tree.

FIG. 2 is an illustration of a display 200 of a minimum tree 204. The minimum tree 204 is generated from the input list of identifiers ID01, ID02 . . . ID08. Each identifier identifies an element in the data hierarchy 120. As shown in FIG. 2, the minimum tree includes a set of edges and nodes, where each node represents an element in the data hierarchy and each edge connects at least two nodes according to the data hierarchy. Each edge represents a relationship between the nodes. In the context of an organization chart, for example, an edge between a parent node and a child node represents a subordinate relationship, where the child node reports to the parent node. For example, a parent node may represent a supervisor, and a child node may represent an employee that reports to the supervisor.

In FIG. 2, each node that represents an identified element identified by the identifier in the list of identifiers 202 is shown with a first visual characteristic, e.g., a darkened circle. Conversely, each node that represents an additional element not identified by an identifier in the list of identifiers 202 is without the first visual characteristic, e.g., a blank circle. For example, the nodes for identifiers ID01-ID08 may represent employees selected for a project. The parent nodes for identifiers ID09, ID12, ID14 and ID15 may represent supervisors of the respective employees represented by the identifiers ID01-ID08. Likewise, parent nodes of identifiers ID09, ID12, ID14 and ID15 may represent department heads that are in charge of the supervisors. Although the nodes for identifiers ID01-ID08 are depicted without nodes depending from them, the nodes are not necessarily leaf nodes. For example, any one of elements corresponding to the nodes ID01-ID08 may have child elements in the data hierarchy. Only in the saturation where a dependent node would be necessary in the spanning tree 204 would the dependent node be displayed, e.g., as indicated by phantom nodes ID24 and ID25, if ID 25 were included in the list of identifiers 202.

The elements that belong to the minimum tree are a proper subset of elements of the data hierarchy 120. For example, the data hierarchy 120 may be such that each parent node may have more child nodes than shown in FIG. 2. For example, each supervisor represented by the parent nodes ID09, ID12, ID14 and ID15 may supervise 20 employees; however, only nodes representing employees identified by the eight identifiers ID01-ID08 are shown. This is because the identified elements and the additional elements define a set of a minimum number of elements necessary to form a path in the data hierarchy 120 that connects all of the identified elements identified by the list of identifiers 202.

The minimum tree 204 visually distinguishes the nodes that represent the identified elements identified by identifiers in the list of identifiers from nodes that represents additional elements not identified by identifiers in the list. This allows viewers to quickly assess other elements (e.g., supervisors) within the data hierarchy that may be impacted by or have some authority over the elements identified by the identifier list. For example, a viewer may realize that to form a team identified by identifier ID01-ID08, the supervisors represented by the nodes ID09, ID12, ID14 and ID15 may need to approve staffing of those employees.

Any appropriate minimum spanning tree algorithm can be used to generate the minimum tree. In an implementation, the algorithm takes as input the list of identifiers and generates, based on the list of identifiers and the data hierarchy, a minimum tree that includes all of the elements identified by the identifiers in the list and any additional elements identified by identifiers necessary to construct the minimum tree.

In some implementations, the minimum tree can include identifiers that extend up to a root node of a hierarchy, e.g., as indicated by phantom nodes for identifier ID10 and ID11, and lines connecting the node for ID16 to the node for identifier ID10, and connecting the node for identifier ID10 to the node for identifier ID11.

In some implementations, the display data causes the display device to scale the minimum tree 204 so that an entirety of the minimum tree 204 is displayed within a visible portion of a viewport on the display device. For example, no matter the complexity of the minimum tree, an initial view may be scaled such that the entirety of the minimum tree is shown in an active window. This provides the viewer with an immediate view of the overall complexity (or simplicity) of the minimum tree.

In another implementation, a node may be selected to show all parent and child nodes connected to the node. For example, the node ID14 may be selected, and nodes for identifiers ID22 and ID23 may appear in phantom. This allows a view to determine alternate elements (or additional elements) that the viewer may want to include in the list of identifiers. By way of further example, suppose the identifier ID05, ID06 and ID07 are developers selected for a project, and during the team formation phase the viewer decides that at least one more developer will be needed. By selecting the node for identifier ID14, which corresponds to a supervisor of a team of developers, the viewer can see that the developers with identifiers ID22 and ID23 are candidates to add to the team.

Figure 3:
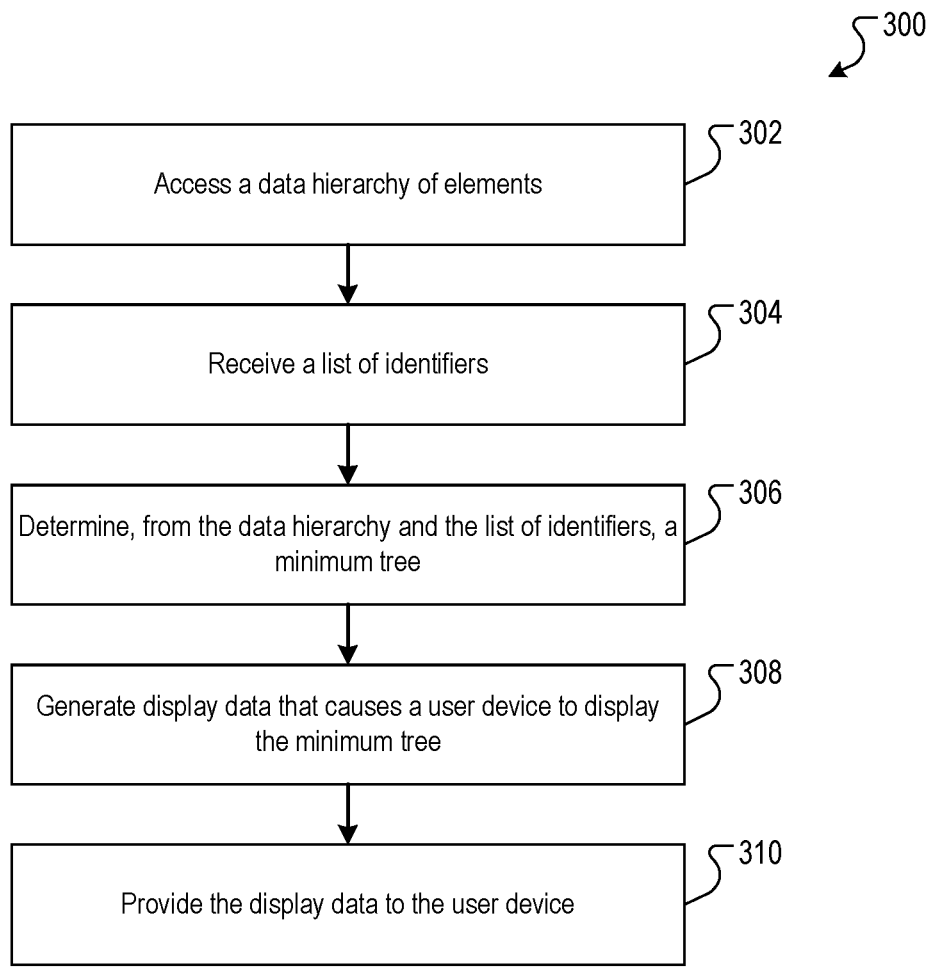
FIG. 3 is a flow chart of example process for determining and displaying a minimum tree.

FIG. 3 is a flow chart of example process 300 for determining and displaying a minimum tree. The process 300 can be implemented in one or more computers used to realize the data hierarchy system 110.

The process 300 accesses a data hierarchy of elements (302). For example, the spanner 114 has access to the data hierarchy 120. The elements including a root elements, intermediate elements and leaf elements. The root element does not descend from another element. The intermediate elements each descends directly from the root element or descends from another intermediate element. Finally, the leaf elements each descend directly from an intermediate element or descend directly from the root element, and no other elements descend from the leaf element.

The process 300 receives a list of identifiers (304). Each identifier identifies an element in the hierarchy as an identified element. For example, the input processor 112 receives the list of identifiers. The list may be, for example, a uniform resource identifier with each identifier appended as a token, a structured list, or some other data structure.

The process 300 determines, from the data hierarchy and the list of identifiers, a minimum tree (306). The minimum tree includes each of the identified elements identified by the list of identifiers, and additional elements that are not identified by the list of identifiers. The identified elements and the additional elements define a set of a minimum number of elements necessary to form a path in the data hierarchy that connects all of the identified elements identified by the list of identifiers. The elements that belong to the minimum tree are a proper subset of elements of the data hierarchy 120.

The process 300 generates display data that causes a user device to display the minimum tree (308), and then provides the display data to the user device (310). For example, the front end 116 receives data describing the minimum tree from the spanner 114, and generates display data, e.g., a web page, that displays the minimum tree.

The tree is displayed as a set of edges and nodes, where each node represents an element in the data hierarchy and each edge connects at least two nodes according to the data hierarchy. The edge represents a relationship between the elements represented by the nodes. Each node that represents an identified element identified by an identifier in the list of identifiers is displayed with a first visual characteristic, and each node that represents an additional element not identified by an identifier in the list of identifiers without the first visual characteristic.

In some implementations, the list of identifiers of FIG. 2 can be collaboratively edited by multiple users in parallel. For example, several users can each access a shared workspace in the cloud and edit the list of identifiers simultaneously to collaborate on building a team of employees (or otherwise selecting a set of elements from the hierarchy data 120, depending on what the hierarchy data 120 represents).

In some implementations, each time an identifier is added or removed from the list 202, the spanner 114 redetermines, from the data hierarchy and the list of identifiers, the minimum tree, and the front end 116 generates a new set of display data to update the display of the minimum tree 204. Alternatively, the spanner 114 and the front end 116 can generate the updates in response to a refresh command that is manually invoked. This latter option reduces processing resources and unnecessary refreshing of the display data.

In a variation of this implementation, after the list is updated, a timer is fired, and if the timer expires without further updates to the list, then the display data is updated. The time may be selected to allow for a dwell time that is indicative of no immediate changes, e.g., three seconds, five seconds, or some other time period.

In some implementations, a user can provide notes for each identified elements. For example, when a user identifies a developer, the user may add a note describing the developer's unique capabilities, e.g., "Very skilled at Python," etc. These notes may be accessible by other users by use of a context menu that instantiates when an operation is performed on a node in the minimum tree 204, e.g., a right click.

Figure 4:
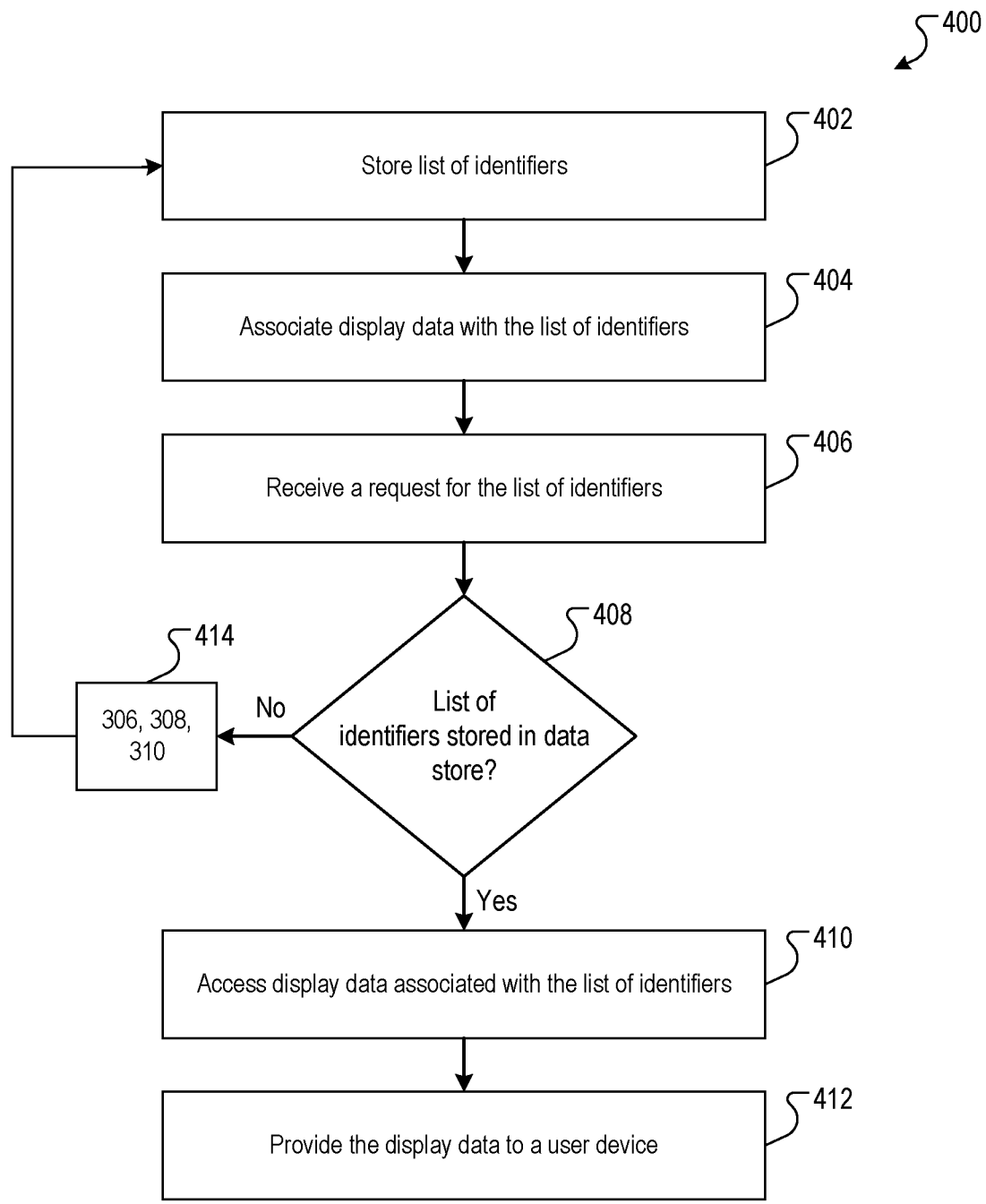
FIG. 4 is a flow chart of an example process for storing display data in association with a list of identifiers.

FIG. 4 is a flow chart of an example process 400 for storing display data in association with a list of identifiers. The process 400 can be implemented in one or more computers used to realize the data hierarchy system 110. The process 400 is used to cache display data generated from identifier lists, and associate the display data with the identifier lists. This reduces response time and processing resources by obviating the need to determine the minimum tree and generate the display data for lists of identifiers that have been previously processed.

The process 400 stores a list of identifiers (402). For example, the input process 112 can store in the identifier lists a list of identifiers received from a user. Any appropriate storage schema can be used. Alternatively, the list can be sorted and a unique hash can be generated from the sorted list, and only the hash is stored.

The process 400 associates display data with the list of identifiers (404). For example, the front end 116, after generating the display data, can store the display data in the display data 124 data store, and associate the specific entry with the corresponding identifier list that was used to determine the minimum tree.

The process 400 receives a request for the list of identifiers (406). The request can be a list of identifiers selected from the identifier lists 122, or, alternatively, a list input by one or more users, such as the uniform resource identifier 202 of FIG. 2.

The process 400 determines whether the list of identifiers is stored in the data store (408). Any appropriate search process can be used to search the identifier lists 122 for a list matching the request list of identifiers. For example, the list may be sorted and a unique hash may be generated, and the hash may be compared to a corresponding hash stored for each identifier list stored in the identifier lists 122 (or simply the hashes if the lists are not stored). Other search processes can also be used.

If the list of identifiers is stored in the data store, then the process 400 accesses display data associated with the list of identifiers (410), and provides the display data to the user device (412). This obviates the need to determine the minimum tree and generate the display data for lists of identifiers that have been previously processed.

Conversely, if the list of identifiers is not stored in the data store (414), then the process 400 proceeds to step 306 of the process 300, and determines, from the data hierarchy and the list of identifiers, a minimum tree (306). Thereafter, steps 308 and 310 are performed. Additionally, after the display data is generated and provided to the user device, the process 400 then returns to step 402, and the new list of identifiers and the new display data are stored and associated for future retrieval.

In some implementations, each time a specific list of identifiers and corresponding display data are accessed, a time stamp in an associated access record is added. In variations of this implementation, the users in an enterprise that access these data are also identified. This enables the system 110 and users to determine who is accessing the minimum tree and how often. Such access information can be used as a signal of other interested parties within an enterprise, and the members of the team identified by the minimum tree may be notified of the access so that they may engage the interesting parties.

In some implementations, each time an identifier is added or removed from the list, a timestamp and data representing the change is stored. For example, a list as initially generated at time T1 may be identifiers ID1, ID2 and ID3, e.g., {ID1, ID2, ID3; T1}. A record for this list and time stamp is then stored. Thereafter, at time T2, identifier ID3 may be added, and another record, {ID1, ID2, ID3, ID4; T2} is stored. At time T3, the identifier ID2 is removed, and another record, {ID1, ID3, ID4; T3} is stored. At a later time, a user may instruct the system 110 to select the records according to the time stamps and generate a sequence of display data, which results in a visual progression of the minimum tree over time. This allows users to see how the minimum tree changes over time as items are added and removed.

As elements are added or removed from the data hierarchy 120, e.g., as employees leave or join a company, the stored display data 124 and identifier lists 122 may become stale. Thus, in some implementations, an error check may be performed when accessing stored display data and identifier lists. For example, in response to determining the list of identifiers is stored as a uniform resource identifier in the data store, the input processor 112 (or the spanner 114) may then determine whether each element identified by an identifier in the list of identifier exists in the data hierarchy 120. If each element identified by an identifier in the list of identifier does exist in the hierarchy, they the front end 116 may access the display data generated from the minimum tree and stored in association with the uniform resource identifier and provide it to the user device.

Figure 5:
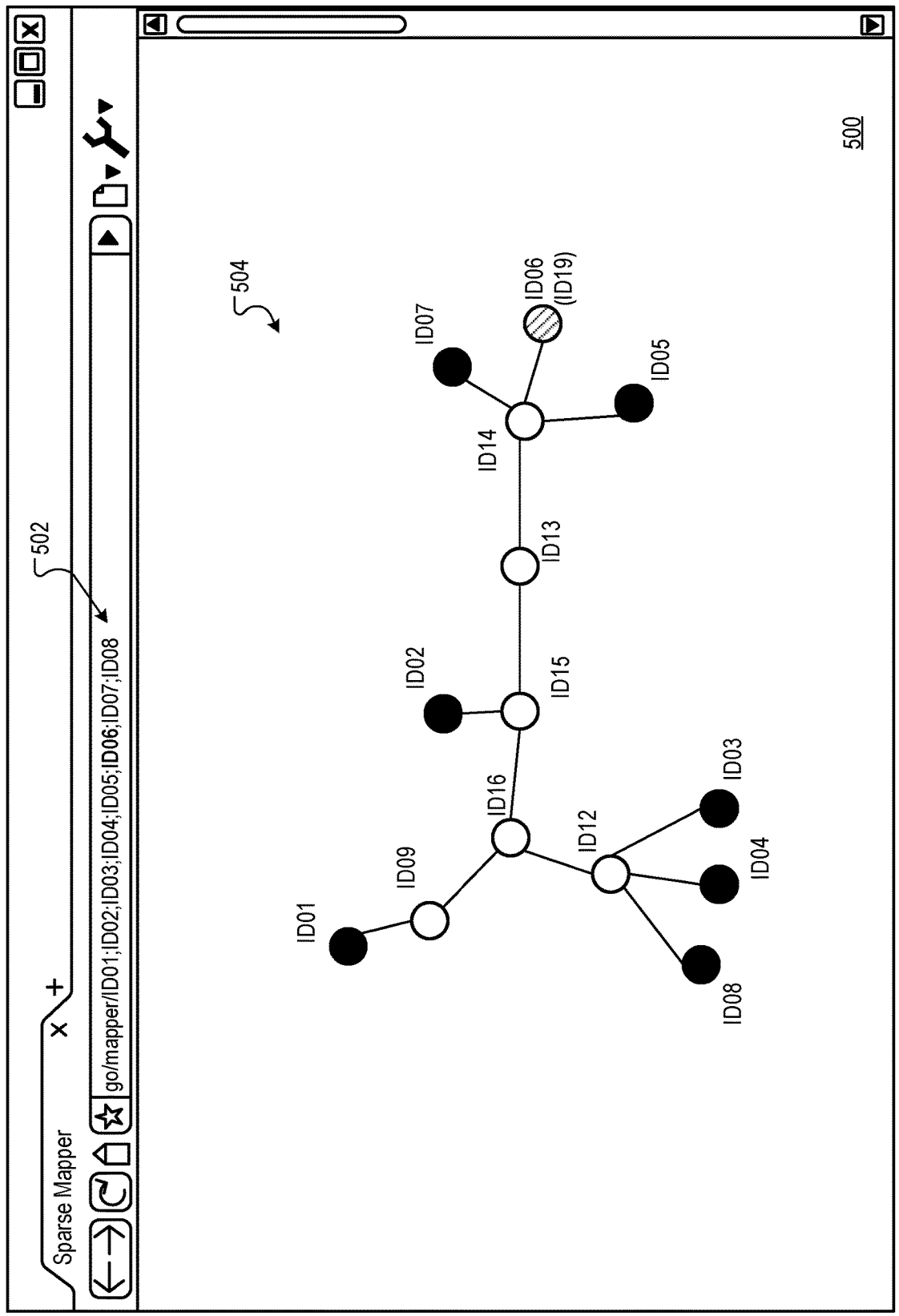
FIG. 5 is an illustration of a display of a minimum tree with the display data being subject to an error process.

However, if one or more of the elements identified by an identifier in the list of identifiers does not exist in the data hierarchy 120, then an error process is performed. For example, as shown in FIG. 5, the list of identifiers 502 includes an identifier, ID06, no longer in the data hierarchy 120. The example error process highlights the identifier in the list 502, and the corresponding display data for the node of the identifier ID06 is adjusted by the front end 116 to visually distinguish the node from all other nodes in the minimum tree 504. In a variation of this implementation, an alternate identifier may be suggested, e.g., ID19. The alternate identifier may be the identifier of an element that replaced the element previously identified by ID06, e.g., a person hired to replace a person that left the company. In another variation, a list of possible identifiers may be suggested, e.g., identifiers for peer elements that each has a same parent element in the data hierarchy. Other error processes that identify the error to the user and, optionally, provide remediation suggestions, can also be used.

In some implementations, a list of identifiers can be selected from an access list associated with a document, or from a list of recipients from an electronic message. For example, when a document is selected, an access control list can be used to create the list of identifiers. Likewise, when an e-mail message is selected, a list of recipient identifiers and the sender identifier can be used to create the list of identifier.

In the examples above, each identifier in a list has a single corresponding node entry in a data hierarchy. However, where multiple data hierarchies are linked, an identifier from a first data hierarchy may have a 1:N relation for N nodes in a second data hierarchy. For example, in the context of an enterprise, employee relationships are reflected in an organizational chart in which each employee has only one corresponding node. Each employee, however, may work on multiple projects within the enterprise, and the projects of the company may be reflected in a corresponding project hierarchy. Thus, each identifier of an employee may have a 1:N mapping into the project hierarchy, as each employee may work on up to N projects. Accordingly, a sparse mapping from the project hierarchy can be generated from a set of identifiers in the organization hierarchy. Each project that the employees work on is thus indicated in the sparse mapping, and labeled with the employees.

Figure 6A:
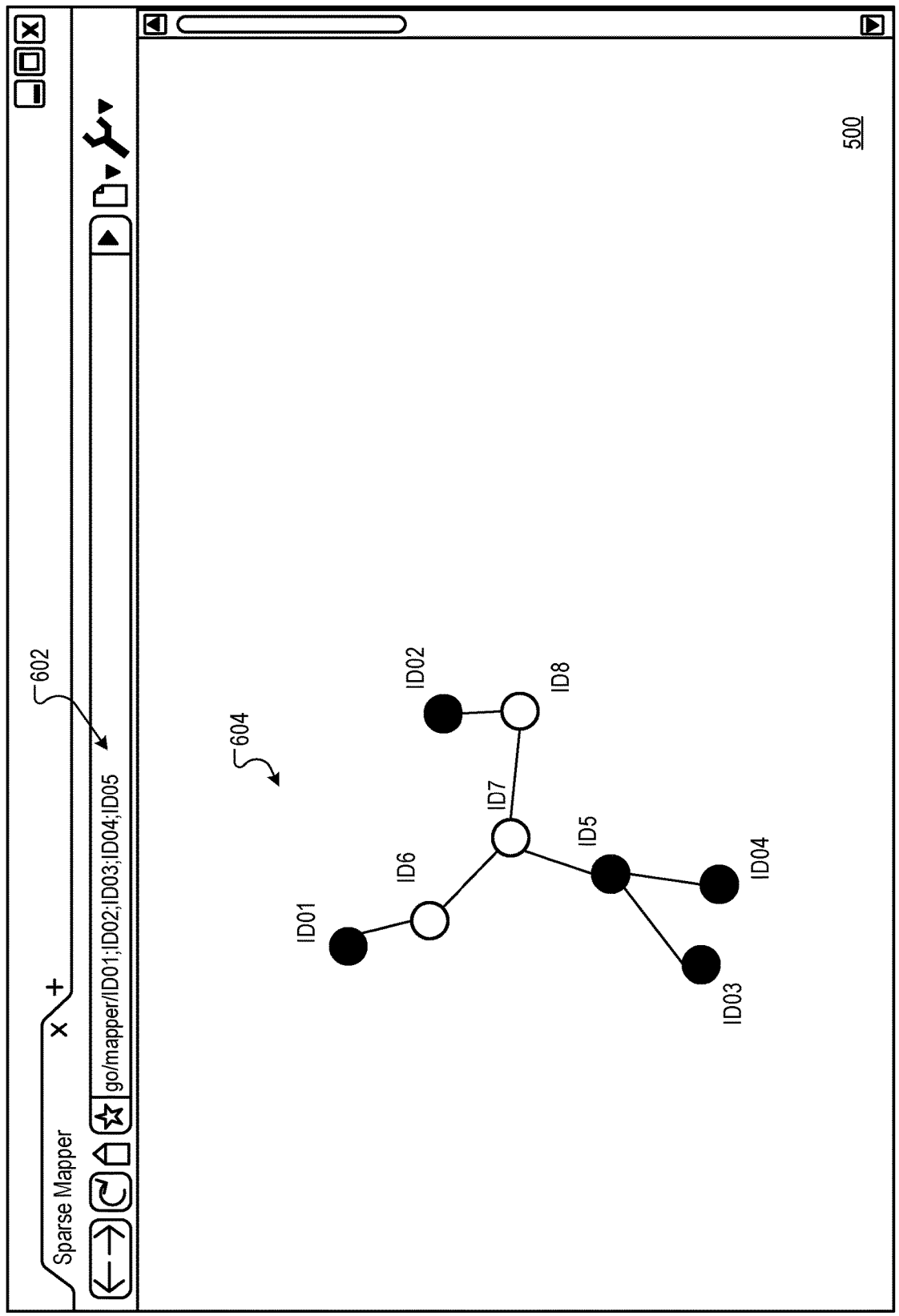
FIG. 6A is an illustration of a display of another minimum tree for a first data hierarchy.
Figure 6B:
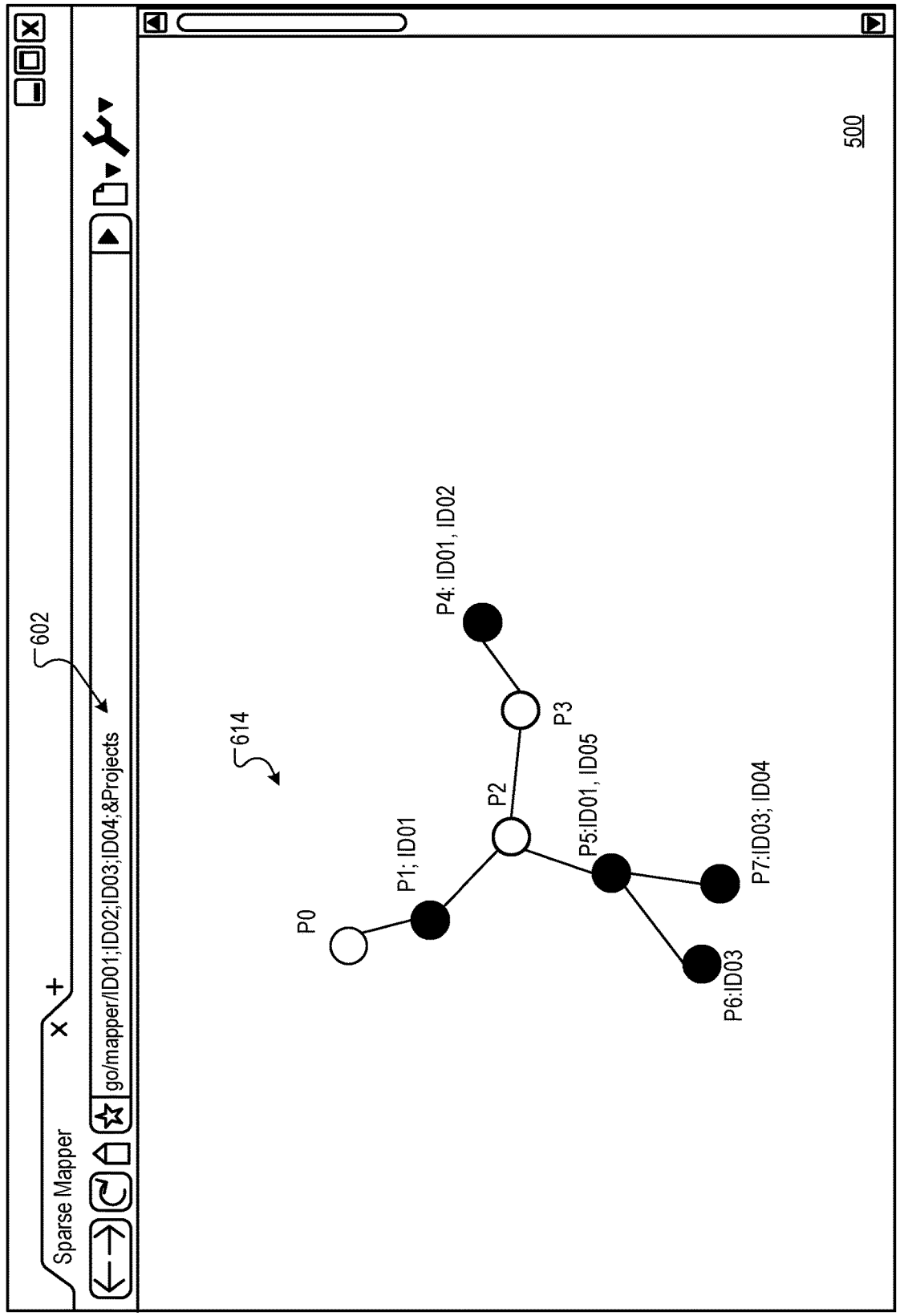
FIG. 6B is an illustration of a display of a minimum tree for a second data hierarchy, wherein the elements in the second data hierarchy correspond to identifiers in the first data hierarchy.

This is illustrated in FIGS. 6A and 6B. In FIG. 6A, the list of identifiers 602 results in the minimum tree 604 for a first data hierarchy. The identifiers are ID01, ID02, ID03, ID04 and ID05. Because each identifier identifies a specific node in the first data hierarchy, each visually distinguished node corresponds to only one of the respective identifiers ID01, ID02, ID03, ID04 and ID05. Each person represented by an identifier also works on one or more projects in the enterprise, and the projects are mapped according to a second data hierarchy. The identifiers ID01, ID02, ID03, ID04 and ID05 are then used to select the projects the employees work on, and a corresponding minimum tree is generated from the project hierarchy.

This is shown in FIG. 6B, which illustrates a display of a minimum tree 614 for a second data hierarchy. The elements in the second data hierarchy correspond to identifiers ID01, ID02, ID03, ID04 and ID05 in the first data hierarchy. Here, the minimum tree 614 includes a proper subset of projects P1-P7. Each visually distinguished project node (i.e., each solid project node) is further labeled with an identifier from the list 602 that identifies a person or persons that work on the respective project. For example, the employee identified by identifier ID01 works on projects P1, P4 and P5; by ID02, project P4; ID03, projects P6 and P7; ID04, project P7; and ID05, project P5.

In situations in which the systems discussed here collect personal information about users, or may make use of personal information, the users may be provided with an opportunity to control whether applications or features collect user information (e.g., information about a user's social network, social actions or activities, profession, a user's preferences, or a user's current location), or to control whether and/or how to receive content that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus.

A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., a FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's user device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a user computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include users and servers. A user and server are generally remote from each other and typically interact through a communication network. The relationship of user and server arises by virtue of computer programs running on the respective computers and having a user-server relationship to each other. In some embodiments, a server transmits data (e.g., an HTML page) to a user device (e.g., for purposes of displaying data to and receiving user input from a user interacting with the user device). Data generated at the user device (e.g., a result of the user interaction) can be received from the user device at the server.

While this specification contains many specific implementation details, these should not be construed as limitations on the scope of any features or of what may be claimed, but rather as descriptions of features specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method performed by data processing apparatus, the method comprising:
    accessing a data hierarchy of elements, the elements including:
        a root element that does not descend from another element;
        a plurality of intermediate elements, wherein each intermediate element descends directly from the root element or descends from another intermediate element; and
        a plurality of leaf elements, wherein each leaf element descends directly from an intermediate element or descends directly from the root element, and from which no other elements descend;
    receiving a list of identifiers, each identifier identifying an element in the data hierarchy as an identified element;
    determining, from the data hierarchy and the list of identifiers, a minimum tree that includes:
        each of the identified elements identified by the list of identifiers; and
        additional elements that are not identified by the list of identifiers;
        wherein the identified elements and the additional elements define a set of a minimum number of elements necessary to form a path in the data hierarchy that connects all of the identified elements identified by the list of identifiers, and wherein the elements that belong to the minimum tree are a proper subset of elements of the data hierarchy;
    generating, from the minimum tree, display data that causes a display device to:
        display the minimum tree as a set of edges and nodes, where each node represents an element in the data hierarchy and each edge connects at least two nodes according to the data hierarchy;
        display each node that represents an identified element identified by an identifier in the list of identifiers with a first visual characteristic; and
        display each node that represents an additional element not identified by an identifier in the list of identifiers without the first visual characteristic.

2. The computer-implemented method of claim 1, wherein the display data causes the display device to scale the minimum tree so that an entirety of the minimum tree is displayed within a visible portion of a viewport on the display device.

3. The computer-implemented method of claim 1, wherein receiving a list of identifiers comprises:
   receiving, from each of a plurality of users, one or more identifiers; and
   adding each of the received identifiers to the list of the identifiers.

4. The computer-implemented method of claim 3, wherein determining, from the data hierarchy and the list of identifiers, the minimum tree, comprises:
   for each received identifier added to the list of identifiers, redetermining, from the data hierarchy and the list of identifiers, the minimum tree.

5. The computer-implemented method of claim 4, wherein receiving the list of identifiers comprises receiving a uniform resource identifier that includes each of the identifiers in the list as a respective token.

6. The computer-implemented method of claim 5, wherein the data hierarchy defines an organizational chart of an enterprise, and each element in the data hierarchy identifies a person within the enterprise and the person's position within the enterprise.

7. The computer-implemented method of claim 1, wherein the list of identifiers comprises a uniform resource identifier that includes each of the identifiers in the list as a respective token; and
   further comprising:
      storing, in a data store, the uniform resource identifier;
      storing, in association with the uniform resource identifier, the display data generated from the minimum tree;
      receiving another list of identifiers, each identifier identifying an element in the data hierarchy as an identified element;
      determining whether the list of identifiers is stored as a uniform resource identifier in the data store;
         in response to determining the list of identifiers is stored as a uniform resource identifier in the data store, accessing the display data generated from the minimum tree and stored in association with the uniform resource identifier, and not generating the display data; and
         in response to determining the list of identifiers is not stored as a uniform resource identifier in the data store:
            determining, from the data hierarchy and the list of identifiers, a minimum tree for the list of identifiers; and
            generating, from the minimum tree, the display data for the list of identifiers.

8. The computer-implemented method of claim 7, further comprising:
   in response to determining the list of identifiers is stored as a uniform resource identifier in the data store:
      determining whether each element identified by an identifier in the list of identifier exists in the data hierarchy;
      in response to determining that each element identified by an identifier in the list of identifier does exist in the data hierarchy, accessing the display data generated from the minimum tree and stored in association with the uniform resource identifier, and not generating the display data;
      in response to determining that each element identified by an identifier in the list of identifier does not exist in the data hierarchy, performing an error process.

9. A system, comprising:
   a data processing apparatus; and
   a non-transitory computer readable medium in data communication with the data processing apparatus and storing instructions executable by the data processing apparatus that upon such execution cause the data processing apparatus to perform operations comprising:
   accessing a data hierarchy of elements, the elements including:
      a root element that does not descend from another element;
      a plurality of intermediate elements, wherein each intermediate element descends directly from the root element or descends from another intermediate element; and
      a plurality of leaf elements, wherein each leaf element descends directly from an intermediate element or descends directly from the root element, and from which no other elements descend;
   receiving a list of identifiers, each identifier identifying an element in the data hierarchy as an identified element;
   determining, from the data hierarchy and the list of identifiers, a minimum tree that includes:
      each of the identified elements identified by the list of identifiers; and
      additional elements that are not identified by the list of identifiers;
      wherein the identified elements and the additional elements define a set of a minimum number of elements necessary to form a path in the data hierarchy that connects all of the identified elements identified by the list of identifiers, and wherein the elements that belong to the minimum tree are a proper subset of elements of the data hierarchy;
   generating, from the minimum tree, display data that causes a display device to:
      display the minimum tree as a set of edges and nodes, where each node represents an element in the data hierarchy and each edge connects at least two nodes according to the data hierarchy;
      display each node that represents an identified element identified by an identifier in the list of identifiers with a first visual characteristic; and
      display each node that represents an additional element not identified by an identifier in the list of identifiers without the first visual characteristic.

10. The system of claim 9, wherein the display data causes the display device to scale the minimum tree so that an entirety of the minimum tree is displayed within a visible portion of a viewport on the display device.

11. The system of claim 9, wherein receiving a list of identifiers comprises:
   receiving, from each of a plurality of users, one or more identifiers; and
   adding each of the received identifiers to the list of the identifiers.

12. The system of claim 10, wherein determining, from the data hierarchy and the list of identifiers, the minimum tree, comprises:
   for each received identifier added to the list of identifiers, redetermining, from the data hierarchy and the list of identifiers, the minimum tree.

13. The system of claim 12, wherein receiving the list of identifiers comprises receiving a uniform resource identifier that includes each of the identifiers in the list as a respective token.

14. The system of claim 13, wherein the data hierarchy defines an organizational chart of an enterprise, and each element in the data hierarchy identifies a person within the enterprise and the person's position within the enterprise.

15. The system of claim 9, wherein the list of identifiers comprises a uniform resource identifier that includes each of the identifiers in the list as a respective token; and
the operations further comprising:
storing, in a data store, the uniform resource identifier;
storing, in association with the uniform resource identifier, the display data generated from the minimum tree;
receiving another list of identifiers, each identifier identifying an element in the data hierarchy as an identified element;
determining whether the list of identifiers is stored as a uniform resource identifier in the data store;
in response to determining the list of identifiers is stored as a uniform resource identifier in the data store, accessing the display data generated from the minimum tree and stored in association with the uniform resource identifier, and not generating the display data; and
in response to determining the list of identifiers is not stored as a uniform resource identifier in the data store:
determining, from the data hierarchy and the list of identifiers, a minimum tree for the list of identifiers; and
generating, from the minimum tree, the display data for the list of identifiers.

16. The system of claim 15, further comprising:
in response to determining the list of identifiers is stored as a uniform resource identifier in the data store:
determining whether each element identified by an identifier in the list of identifier exists in the data hierarchy;
in response to determining that each element identified by an identifier in the list of identifier does exist in the data hierarchy, accessing the display data generated from the minimum tree and stored in association with the uniform resource identifier, and not generating the display data;
in response to determining that each element identified by an identifier in the list of identifier does not exist in the data hierarchy, performing an error process.

17. A non-transitory computer readable medium storing instructions executable by a data processing apparatus that upon such execution cause the data processing apparatus to perform operations comprising:
accessing a data hierarchy of elements, the elements including:
a root element that does not descend from another element;
a plurality of intermediate elements, wherein each intermediate element descends directly from the root element or descends from another intermediate element; and
a plurality of leaf elements, wherein each leaf element descends directly from an intermediate element or descends directly from the root element, and from which no other elements descend;
receiving a list of identifiers, each identifier identifying an element in the data hierarchy as an identified element;
determining, from the data hierarchy and the list of identifiers, a minimum tree that includes:
each of the identified elements identified by the list of identifiers; and
additional elements that are not identified by the list of identifiers;
wherein the identified elements and the additional elements define a set of a minimum number of elements necessary to form a path in the data hierarchy that connects all of the identified elements identified by the list of identifiers, and wherein the elements that belong to the minimum tree are a proper subset of elements of the data hierarchy;
generating, from the minimum tree, display data that causes a display device to:
display the minimum tree as a set of edges and nodes, where each node represents an element in the data hierarchy and each edge connects at least two nodes according to the data hierarchy;
display each node that represents an identified element identified by an identifier in the list of identifiers with a first visual characteristic; and
display each node that represents an additional element not identified by an identifier in the list of identifiers without the first visual characteristic.

\* \* \* \* \*